United States Patent
Dash et al.

(10) Patent No.: US 11,618,136 B2
(45) Date of Patent: Apr. 4, 2023

(54) TIE DRILL AND LAG SCREW INSERTER DEVICE FOR THE RAIL INDUSTRY

(71) Applicant: FTS Tools, LLC, Lynchburg, VA (US)

(72) Inventors: Corey Dash, Mount Arlington, NJ (US); Peter M. Bartek, Ledgewood, NJ (US)

(73) Assignee: FTS Tools, LLC, Lynchburg, VA (US)

( * ) Notice: Subject to any disclaimer, the term of this patent is extended or adjusted under 35 U.S.C. 154(b) by 0 days.

(21) Appl. No.: 17/100,649

(22) Filed: Nov. 20, 2020

(65) Prior Publication Data
US 2021/0154808 A1    May 27, 2021

Related U.S. Application Data

(60) Provisional application No. 62/938,772, filed on Nov. 21, 2019.

(51) Int. Cl.
  *B25B 21/00*   (2006.01)
  *E01B 29/28*   (2006.01)
(52) U.S. Cl.
  CPC ............ *B25B 21/002* (2013.01); *E01B 29/28* (2013.01)
(58) Field of Classification Search
  CPC .... B25B 21/002; B25B 21/007; B25B 21/008
  USPC ............................................... 173/46, 162.2
  See application file for complete search history.

(56) References Cited

U.S. PATENT DOCUMENTS

| | | | | |
|---|---|---|---|---|
| 1,902,530 A * | 3/1933 | Terry | ...................... | B25D 17/04 267/137 |
| 2,579,533 A * | 12/1951 | Alger | ...................... | E21B 19/06 173/112 |
| 4,317,282 A * | 3/1982 | Pace | ......................... | B25F 3/00 30/500 |
| 4,924,578 A * | 5/1990 | Chagnon | .................... | B25F 3/00 451/461 |
| 5,224,803 A * | 7/1993 | Lallier | ................... | B23B 45/003 409/20 |
| 6,976,909 B1 * | 12/2005 | Hoover | .................... | B24B 23/02 451/354 |
| 2003/0093669 A1 | 5/2003 | Morais et al. | | |
| 2007/0121950 A1 | 5/2007 | Okaue | | |
| 2018/0234936 A1 | 8/2018 | Crowe et al. | | |
| 2020/0141064 A1 | 5/2020 | Benjamin et al. | | |

OTHER PUBLICATIONS

International Search Report issued in PCT/US2020/052025 dated Dec. 30, 2020.

* cited by examiner

*Primary Examiner* — Michelle Lopez
(74) *Attorney, Agent, or Firm* — Banner & Witcoff, Ltd.

(57) ABSTRACT

A portable device is disclosed for drilling a hole through a plate and into a wooden tie and/or inserting a lag screw into the hole in the plate and into the wooden tie. The portable device may include a handle and a removable drill with a rechargeable battery that provides power to the portable device. In various embodiments, the portable device may include a gear ratio and gear reduction system configured to allow a user to change speed and torque settings for the portable device independent from the battery-powered drill. In some embodiments, the portable device may include a quick connect/disconnect component configured to enable the portable device to be used as a tie drill device or a lag screw inserter device by interchangeably connecting either a drill bit or a lag screw socket to the portable device.

20 Claims, 16 Drawing Sheets

TIE DRILL AND LAG SCREW INSERTER DEVICE FOR THE RAIL INDUSTRY

RELATED APPLICATIONS

This application claims priority to U.S. Provisional Patent Application No. 62/938,772, filed Nov. 21, 2019, the content of which is incorporated herein by reference in its entirety.

FIELD OF THE INVENTION

The present invention relates to the rail industry and, more particularly, to one or more devices for drilling a hole through a plate and into a wooden tie and inserting a lag screw

BACKGROUND OF THE INVENTION

Currently, there are limited methods for drilling a hole through a plate and into a wooden tie and inserting a lag screw. Presently, two different and distinct tools are used for each of these operations. A tie drill tool is used to drill a hole through a plate and into a wooden tie. A lag screw inserter tool is then utilized to insert and put the lag screw into the hole in the plate and into the wooden tie. The current methods and tools use hydraulics and internal combustion engine. The weights for each of the tools can be over 60 pounds for each type of tool. There is a need for a portable device configured to easily drill a hole through a plate and into a wooden tie or to insert and put a lag screw into the hole in the plate and into the wooden tie. Currently, there also are no battery-operated tie drill and lag screw inserter devices that operate as one tool. A single tool capable of both drilling a hole through a plate and into a wooden tie and inserting a lag screw would be a great improvement.

SUMMARY OF THE INVENTION

Aspects of this disclosure relate to a portable device for drilling a hole through a plate and into a wooden tie and/or inserting a lag screw into the hole in the plate and into the wooden tie. The portable device may comprise a tie drill device, a lag screw inserter device, or a device capable of functioning as both a tie drill device and a lag screw inserter device. In various embodiments, the portable device may include a replaceable and removable drill, a handle, and a quick connect system to connect the drill to the portable device. The drill may comprise an electric-powered drill with a rechargeable battery that provides power to the portable device. In various embodiments, the portable device may include a gear ratio and gear reduction system configured to allow a user to change speed and torque settings for the portable device independent from the drill. The portable device may also include a preset distance system setting with a knob and a spring-guided mechanism with preset distances to assist the user with setting the distance. The portable device may also include a leveling plate to ensure that each drill bit and lag screw is aligned and installed vertically and a removable drill guard to protect the drill.

In various embodiments, the portable device may include a handle assembly configured to connect the removable drill to the portable device. In some embodiments, the handle assembly may be configured to connect the removable drill to a drive shaft of the portable device. The handle assembly may include a drill face plate and one or more fastening straps to removably secure the drill to the portable device. The handle assembly may also include one or more side plates to connect the handle assembly to the body of the portable device. In some embodiments, the handle assembly may include a drill guard structure configured protect the removable drill when connected to the portable device.

In some embodiments, the portable device may include two quick connect/disconnect components: a first quick connect/disconnect component configured to make the drill removable and replaceable and a second quick connect/disconnect component configured to receive a drill bit or a lag screw socket. The second quick connect/disconnect component may enable the portable device to be used as a tie drill device or a lag screw inserter device by interchangeably connecting either a drill bit or a lag screw socket to the portable device. As such, in some embodiments, the portable device may allow a user in the rail industry to use one tool to perform two different and distinct functions. When a drill bit is connected to the portable device, the portable device may allow a user to drill a hole through a plate and into a wooden tie. The user may then disconnect the drill bit and connect a lag screw socket to the portable device in order to insert a lag screw into the hole in the plate and into the wooden tie.

These and other objects, features, and characteristics of the invention disclosed herein will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The present invention is illustrated by way of example and not limited in the accompanying figures in which like reference numerals indicate similar elements and in which.

These drawings are provided for purposes of illustration only and merely depict typical or example embodiments. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION OF THE INVENTION

In the following description of various examples of the invention, reference is made to the accompanying drawings, which form a part hereof, and in which are shown by way of illustration various example parts, structures, systems, and steps in which aspects of the invention may be practiced. It is to be understood that other specific arrangements of example parts, structures, systems, and steps may be utilized, and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures. Nothing in this specification should be construed as requiring a specific three-dimensional orientation of structures in order to fall within the scope of this invention.

This invention relates to a portable device 100 for drilling a hole through a plate and into a wooden tie and/or inserting a lag screw into the hole in the plate and into the wooden tie. The portable device 100 may comprise a tie drill device, a lag screw inserter device, or a device capable of functioning as both a tie drill device and a lag screw inserter device. In various embodiments, portable device 100 may be battery-powered (or battery-operated) device. In other words, portable device 100 may be battery operated and use battery operation as opposed to hydraulics. In various embodiments, powering portable device 100 with a battery eliminates weight and difficulties associated with hydraulic devices and tools.

Figure 1:
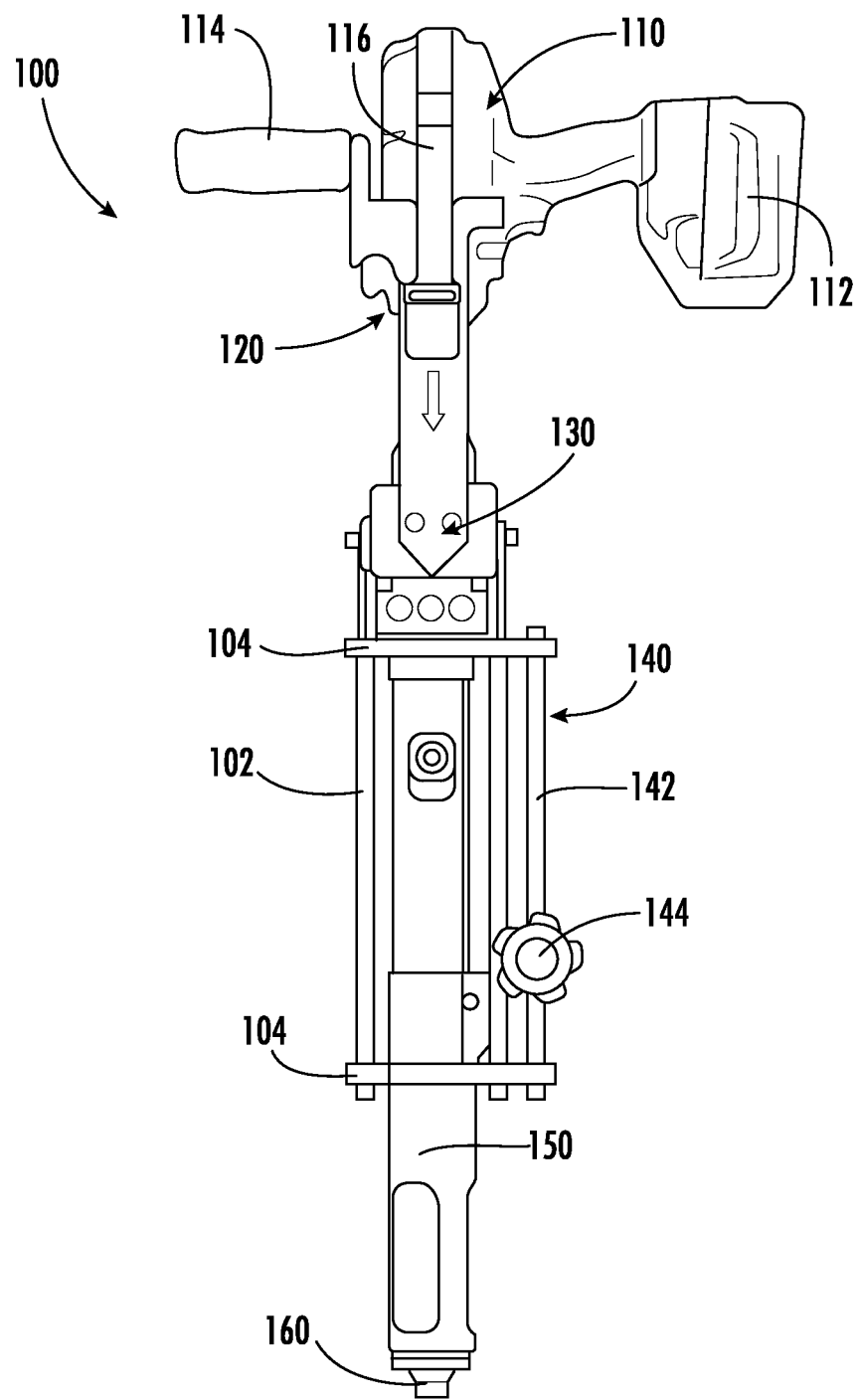
FIG. 1 depicts a side view of a portable device for drilling a hole through a plate and into a wooden tie and/or inserting a lag screw into the hole in the plate and into the wooden tie, according to one or more aspects described herein.
Figure 2:
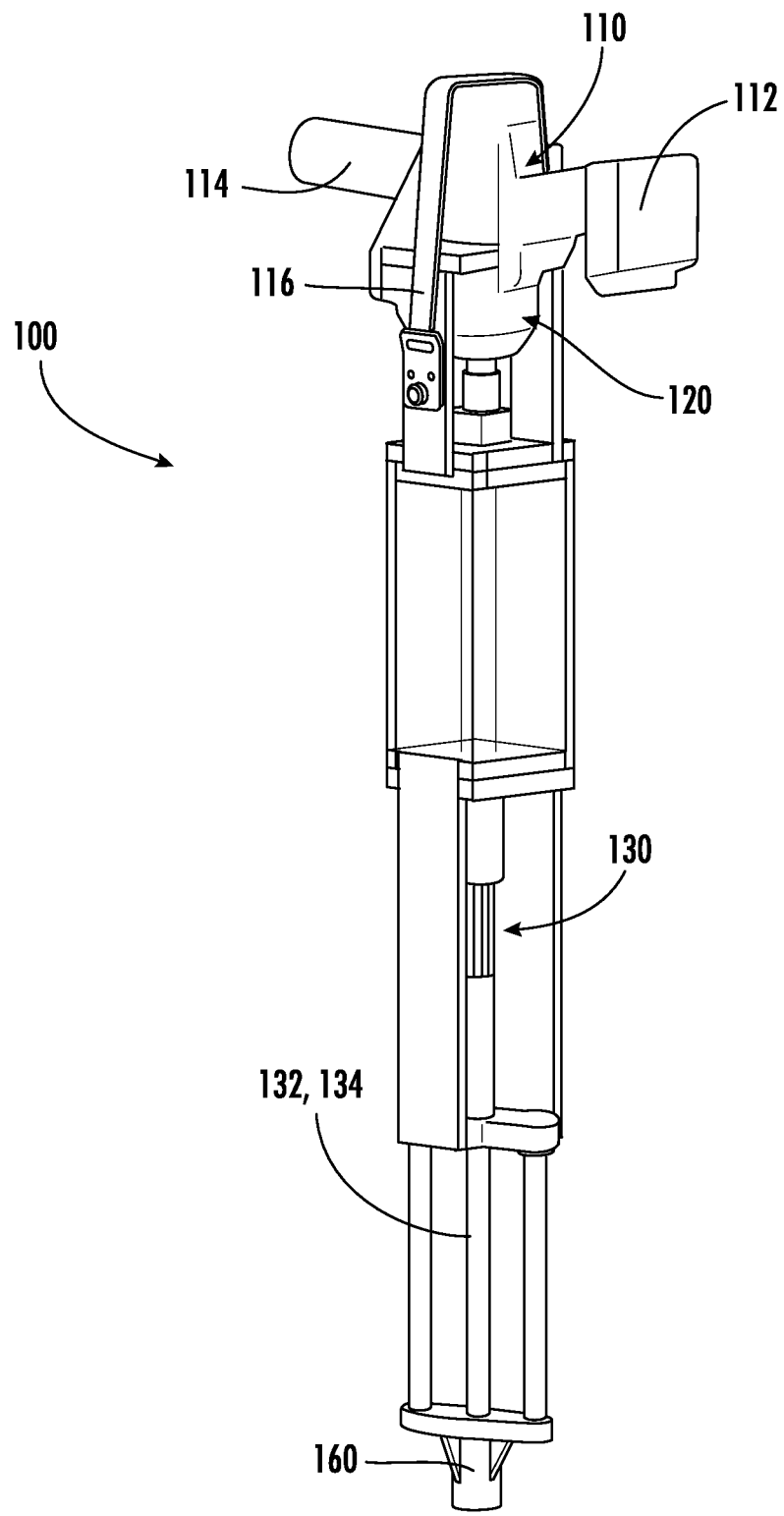
FIG. 2 depicts a side perspective view of the portable device for drilling a hole through a plate and into a wooden tie and/or inserting a lag screw into the hole in the plate and into the wooden tie, according to one or more aspects described herein.

FIG. 1 depicts a side view of a portable device 100 configured for drilling a hole through a plate and into a wooden tie and/or inserting a lag screw into the hole in the plate and into the wooden tie, according to one or more aspects described herein. FIG. 2 depicts a side perspective view of the portable device for drilling a hole through a plate and into a wooden tie and/or inserting a lag screw into the hole in the plate and into the wooden tie, according to one or more aspects described herein. As illustrated in FIG. 1 and FIG. 2, the portable device 100 may include a replaceable and removable drill 110 with a handle 114 and a quick connect system 116. In some embodiments, portable device 100 may include a gear ratio and gear reduction system 120 configured to change the torque and speed independently from drill 110. In some embodiments, portable device 100 may include a spring-guided mechanism 140 that provides a pre-set distance system 142 with an adjustable knob 144 that are configured to allow a user to drill down a preset (or predetermined) distance. The spring-guided mechanism 140 may span from one or more offsets 102 between a top offset plate 104A and a bottom offset plate 104B as part of the portable device 100. In some embodiments, portable device 100 may include a removable drill guard 150 for use with, and to protect, a drill bit (e.g., drill bit 132). The removable drill guard 150 may be located approximate a bottom of the one or more offsets 102 and the bottom offset plate 104B. A leveling plate 160 may be located approximate a bottom of the removable drill guard 150. In various embodiments, the spring-guided mechanism 140 and/or the leveling plate 160 may be utilized to ensure the drill bit 132 and the lag screw socket 134 are vertical and aligned when in use.

In various embodiments, drill 110 may comprise an impact drill, driver, wrench, or similar tool, such as electronic, pneumatic, or other such drill-type tool configured to perform similar functionality as a battery-operated drill-type tool. In various embodiments, drill 110 may include a battery 112. In various embodiments, battery 112 of drill 110 may comprise a rechargeable battery. Battery 112 may be configured to provide power to portable device 100. In some embodiments, portable device 100 may be powered via additional and/or alternative power means, such as via AC power, replaceable fuel cell, and/or other stored/created electric power techniques known in the art. In some embodiments, portable device 100 may be integrally-powered by a DC motor, servo motor, or stepper motor. In some embodiments, portable device 100 may be powered by a set of batteries (AC or DC) or battery packs. In some embodiments, portable device 100 may include or be connected to a battery management system. For example, portable device 100 may be powered by a set of batteries (AC or DC) or battery packs and/or include or be connected to a battery management system as described in U.S. Provisional Patent Application No. 63/092,317, entitled "BATTERY-OPERATED SPIKE DRIVER," the disclosure of which is hereby incorporated by reference in its entirety herein.

In some embodiments, portable device 100 may include two quick disconnect components: quick connect system 116 and quick connect and disconnect connector 130. In various embodiments, quick connect system 116 may be configured to make drill 110 removable and replaceable. In some embodiments, portable device 100 may also include quick connect and disconnect connector 130. Quick connect and disconnect connector 130 may be configured to receive a drill bit 132 or a lag screw socket 134. Quick connect and disconnect connector 130 may enable portable device 100 to be configured as a tie drill device or a lag screw inserter device by interchangeably connecting either drill bit 132 or lag screw socket 134 to portable device 100. As such, in some embodiments, portable device 100 may allow a user in the rail industry to use one tool to perform two different and distinct functions. When drill bit 132 is attached via the quick connect and disconnect connector 130, portable device 100 may allow a user to drill a hole through a plate and into a wooden tie. The user may then disconnect drill bit 132 and connect lag screw socket 134 via quick connect and disconnect connector 130 in order to insert a lag screw into the hole in the plate and into the wooden tie.

In various embodiments, drill 110 may be attached to gear ratio and gear reduction system 120 via quick connect system 116. In various embodiments, gear ratio and gear reduction system 120 may include a torque and speed setting independent from the drill 110. The gear ratio and gear reduction system 120 may then be connected to the drill bit 132 and/or the lag screw socket 134. In embodiments in which portable device 100 comprises a device capable of functioning as both a tie drill device and a lag screw inserter device, portable device may include quick connect and disconnect connector 130. As described herein, the quick connect and disconnect connector 130 may allow switching and quick connection and disconnection between the two different tools—the drill bit 132 and the lag screw socket 134. In the foregoing embodiment, drill 110 may be attached to gear ratio and gear reduction system 120 via quick connect system 116, and the gear ratio and gear reduction system 120 may then be connected to quick connect and disconnect connector 130.

Figure 3:
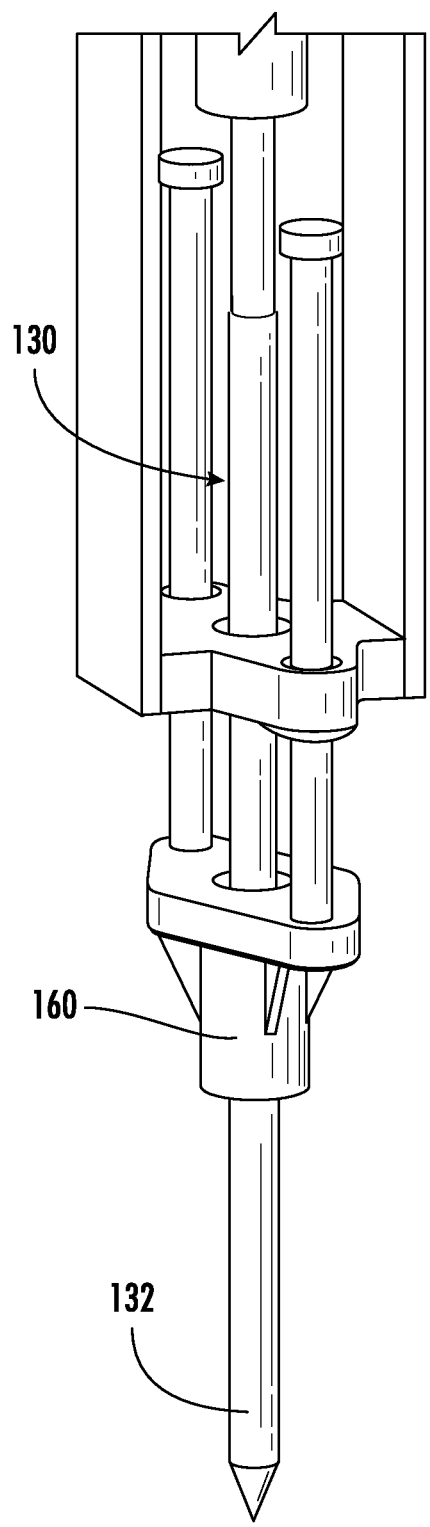
FIG. 3 depicts a side perspective close-up view of the bottom portion of the portable device configured for drilling a hole through a plate and into a wooden tie, according to one or more aspects described herein.
Figure 4:
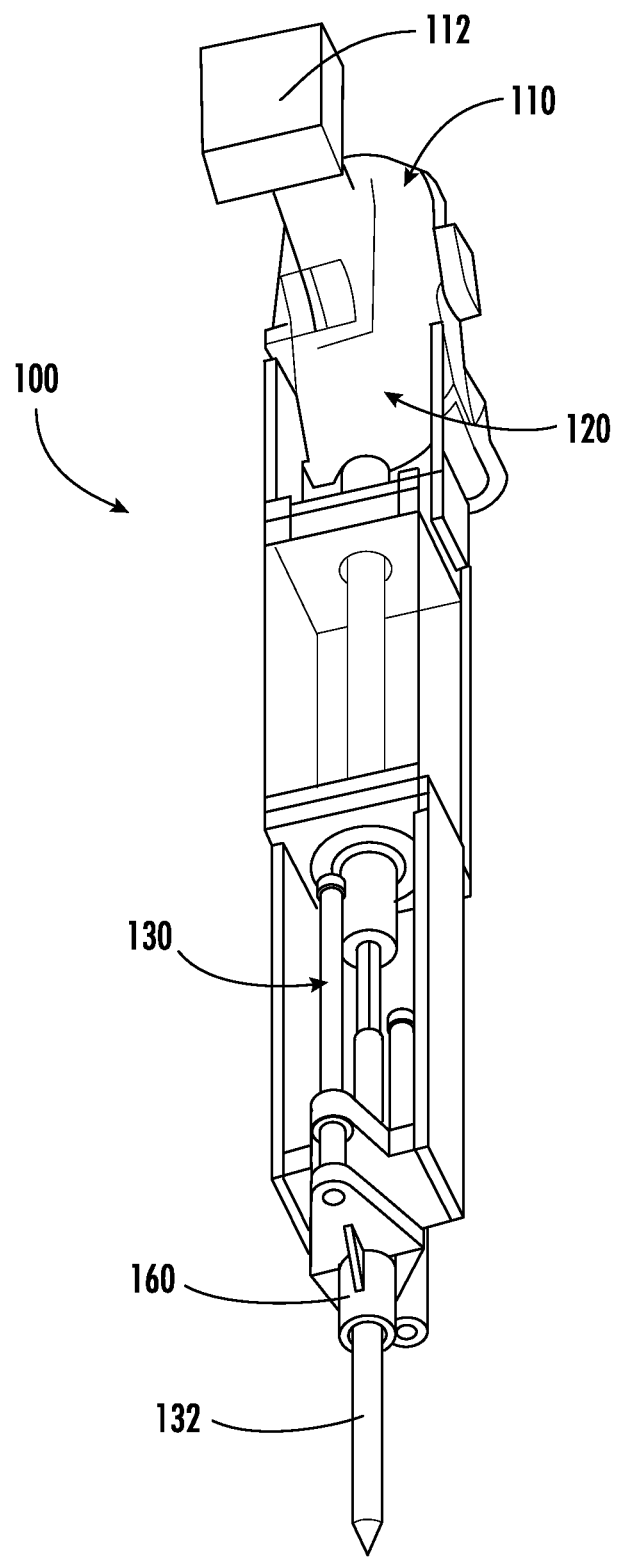
FIG. 4 depicts another side perspective view of the portable device configured for drilling a hole through a plate and into a wooden tie, according to one or more aspects described herein.
Figure 5:
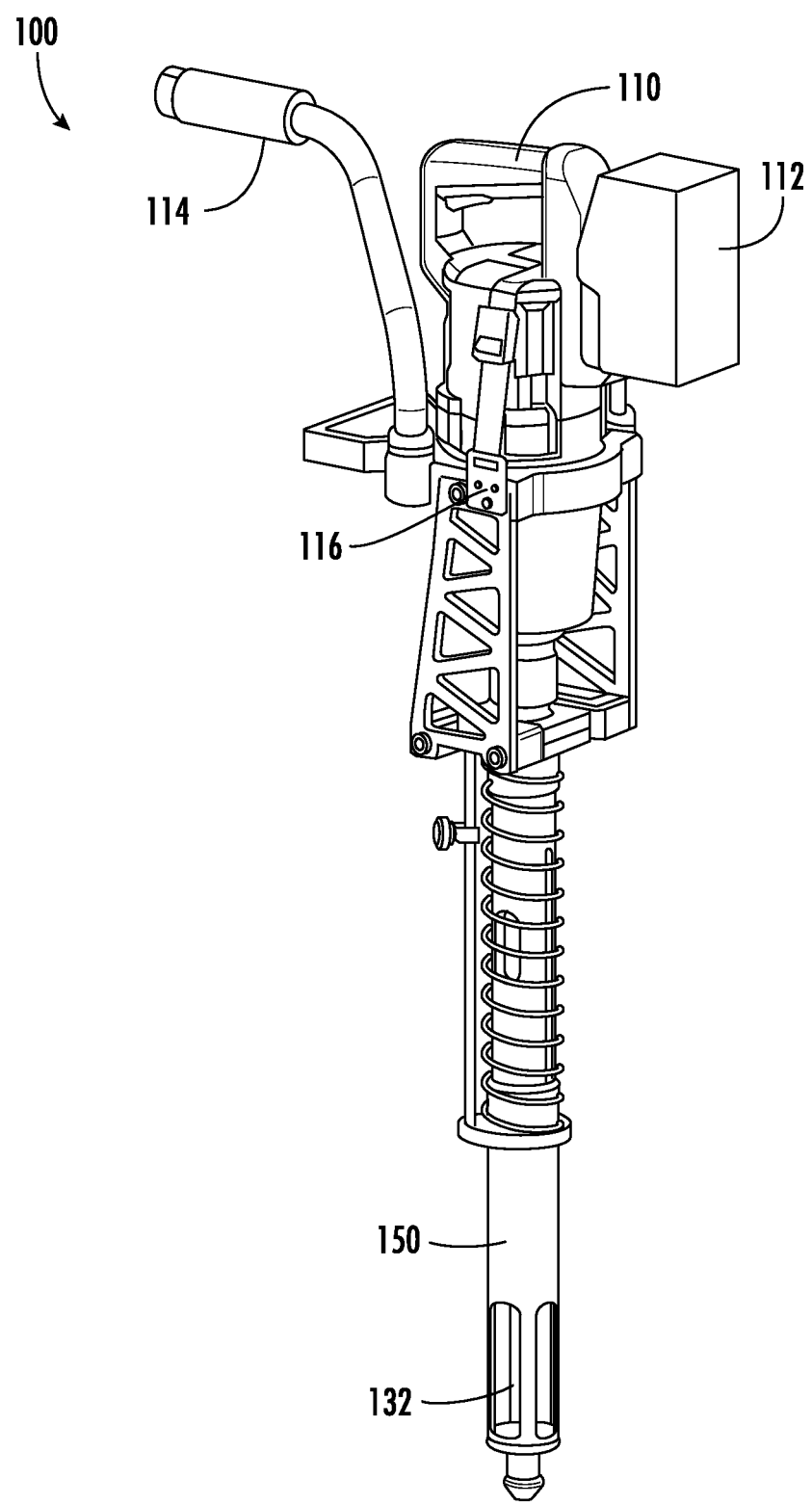
FIG. 5 depicts a perspective view of an example embodiment of the portable device configured as tie drill device, according to one or more aspects described herein.
Figure 6:
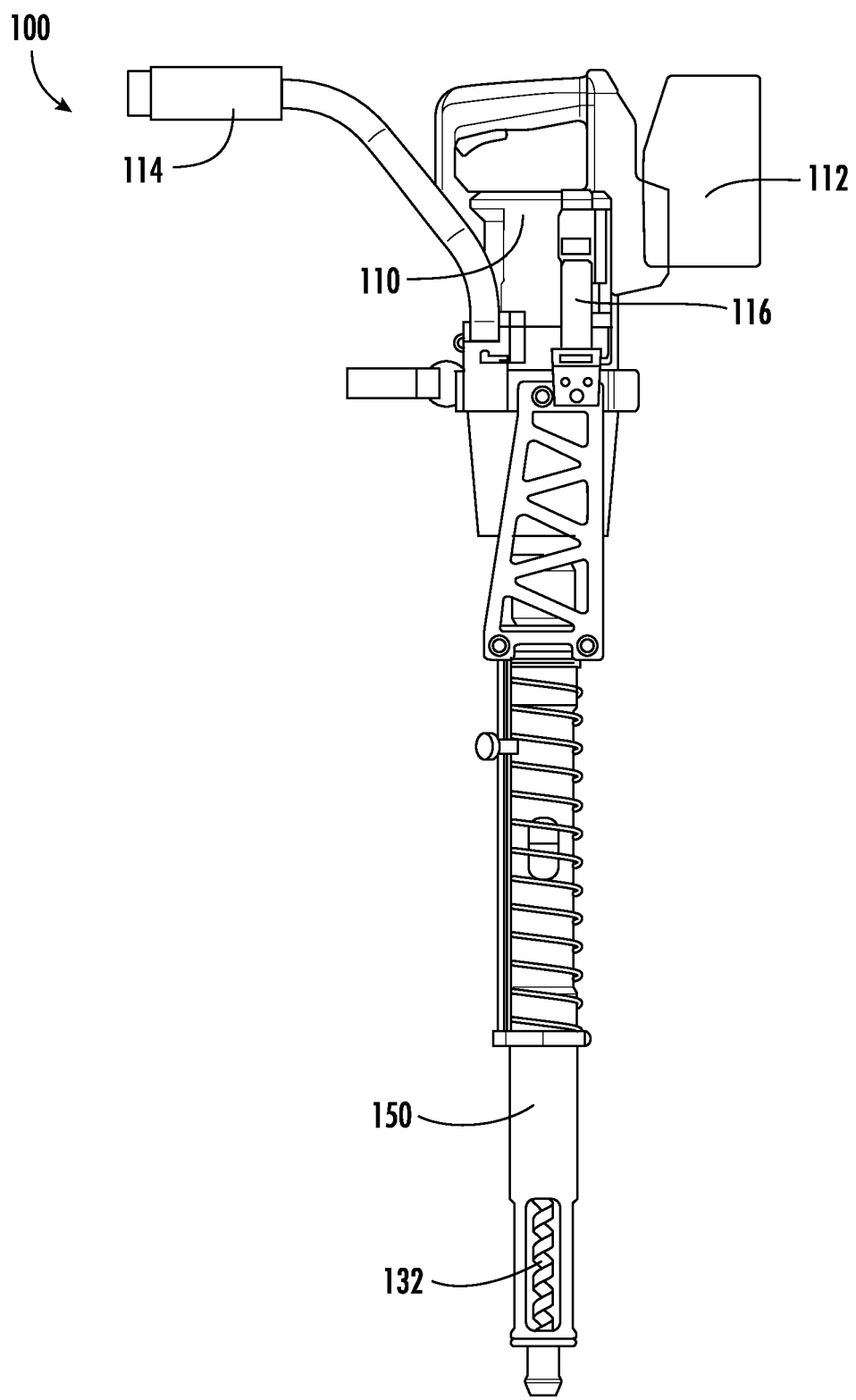
FIG. 6 depicts a side view of the example embodiment of the portable device configured as tie drill device, according to one or more aspects described herein.
Figure 7:
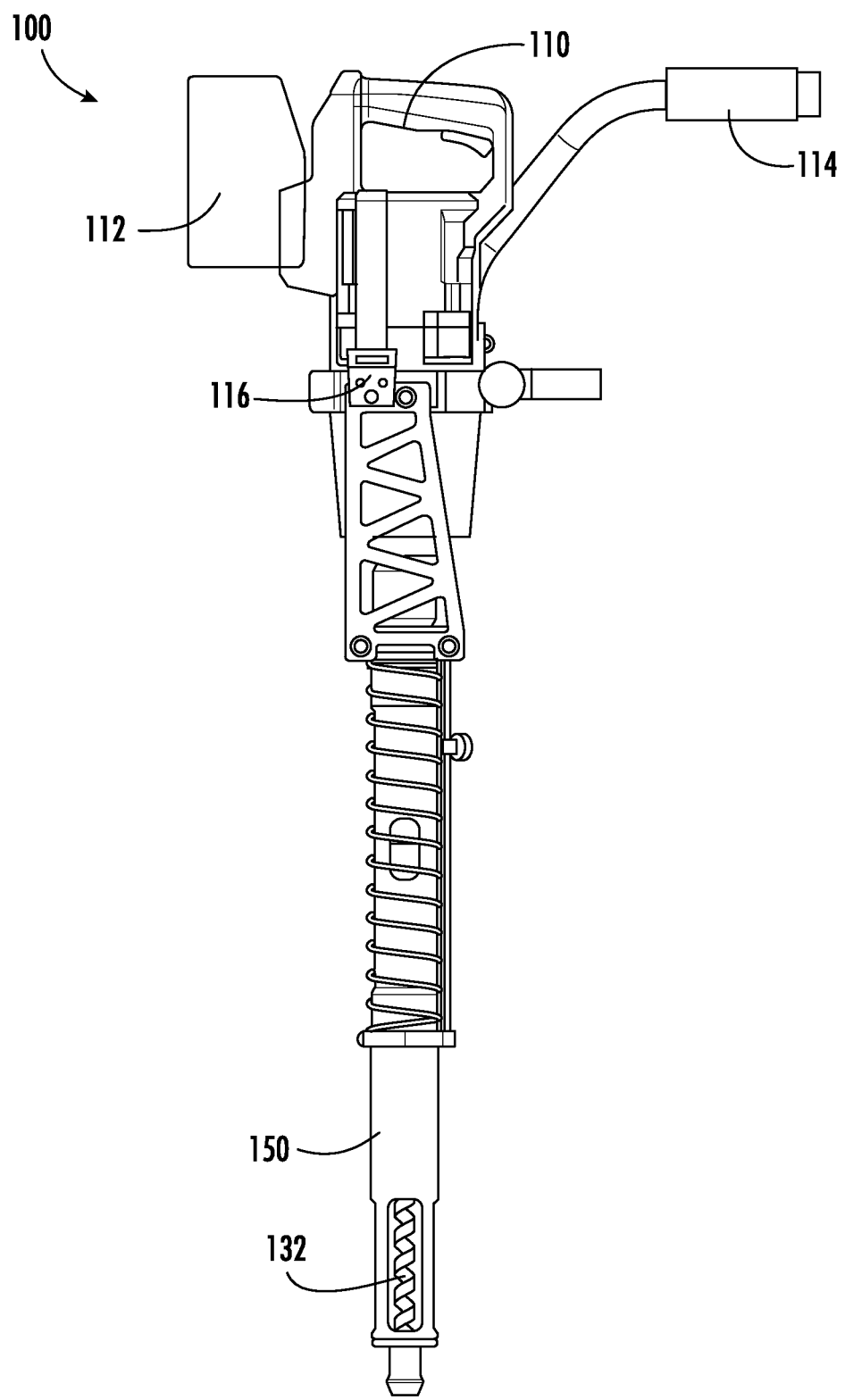
FIG. 7 depicts another side view of the example embodiment of the portable device configured as tie drill device, according to one or more aspects described herein.

FIG. 3 depicts a side perspective close-up view of the bottom portion of portable device 100 configured for drilling a hole through a plate and into a wooden tie, according to one or more aspects described herein. FIG. 4 depicts another side perspective view of portable device 100 configured for drilling a hole through a plate and into a wooden tie, according to one or more aspects described herein. FIGS. 5-7 depict an example embodiment of portable device 100 configured as tie drill device, according to one or more aspects described herein. As described herein, portable device 100 may comprise a tie drill device, a lag screw inserter device, or a device capable of functioning as both a tie drill device and a lag screw inserter device. Accordingly, the portable device depicted in FIGS. 3-7 may comprise a tie drill device or a device capable of functioning as both a tie drill device and a lag screw inserter device that is depicted in a configuration in which a drill bit (e.g., drill bit 132) is attached to portable device 100 via quick connect and disconnect connector 130.

Figure 8:
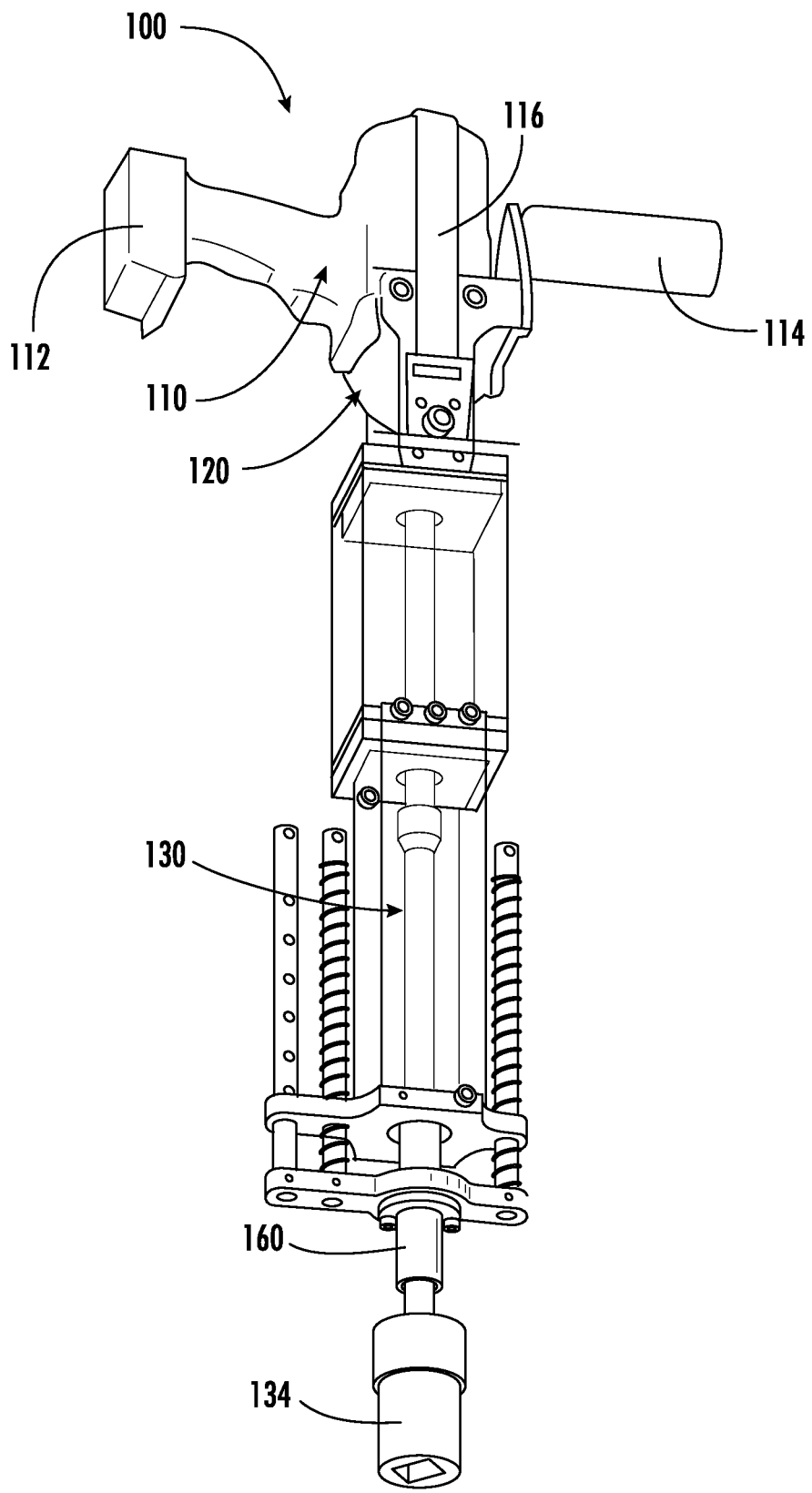
FIG. 8 depicts a side perspective view of the portable device configured for inserting a lag screw into the hole in the plate and into the wooden tie, according to one or more aspects described herein.
Figure 9:
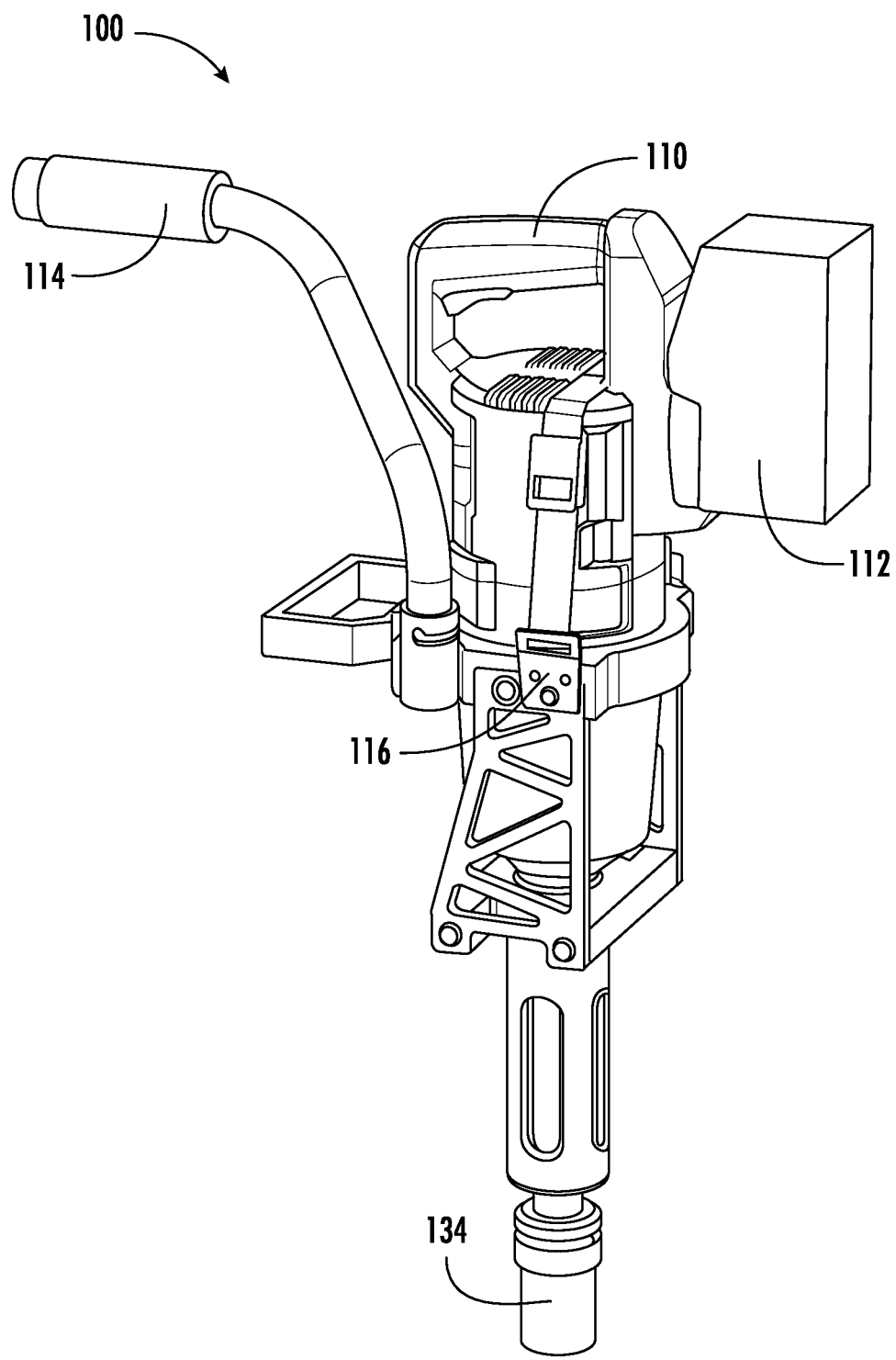
FIG. 9 depicts a perspective view of an example embodiment of the portable device configured as a lag screw inserter device, according to one or more aspects described herein.
Figure 10:
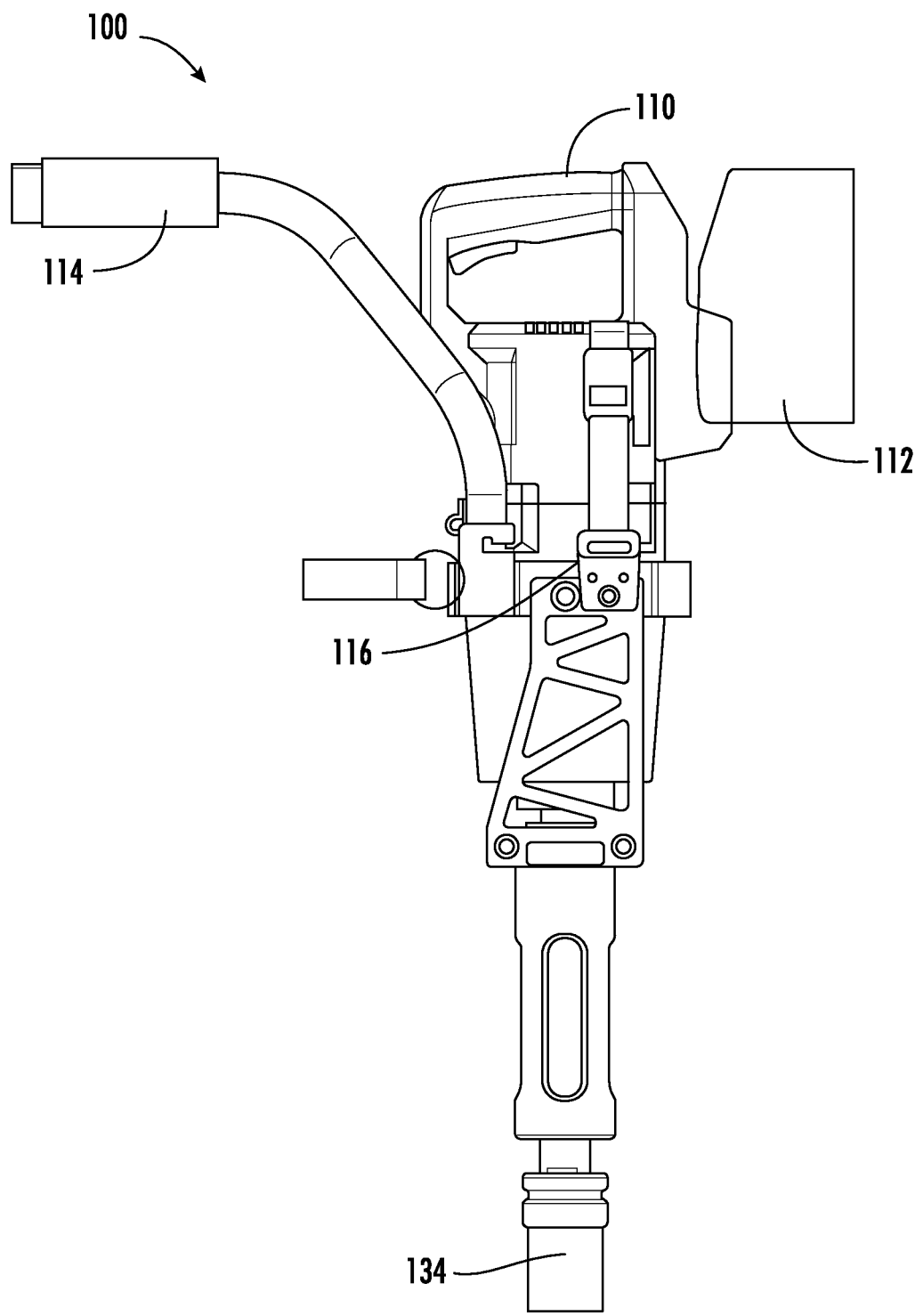
FIG. 10 depicts a side view of the example embodiment of the portable device configured as a lag screw inserter device according to one or more aspects described herein.
Figure 11:
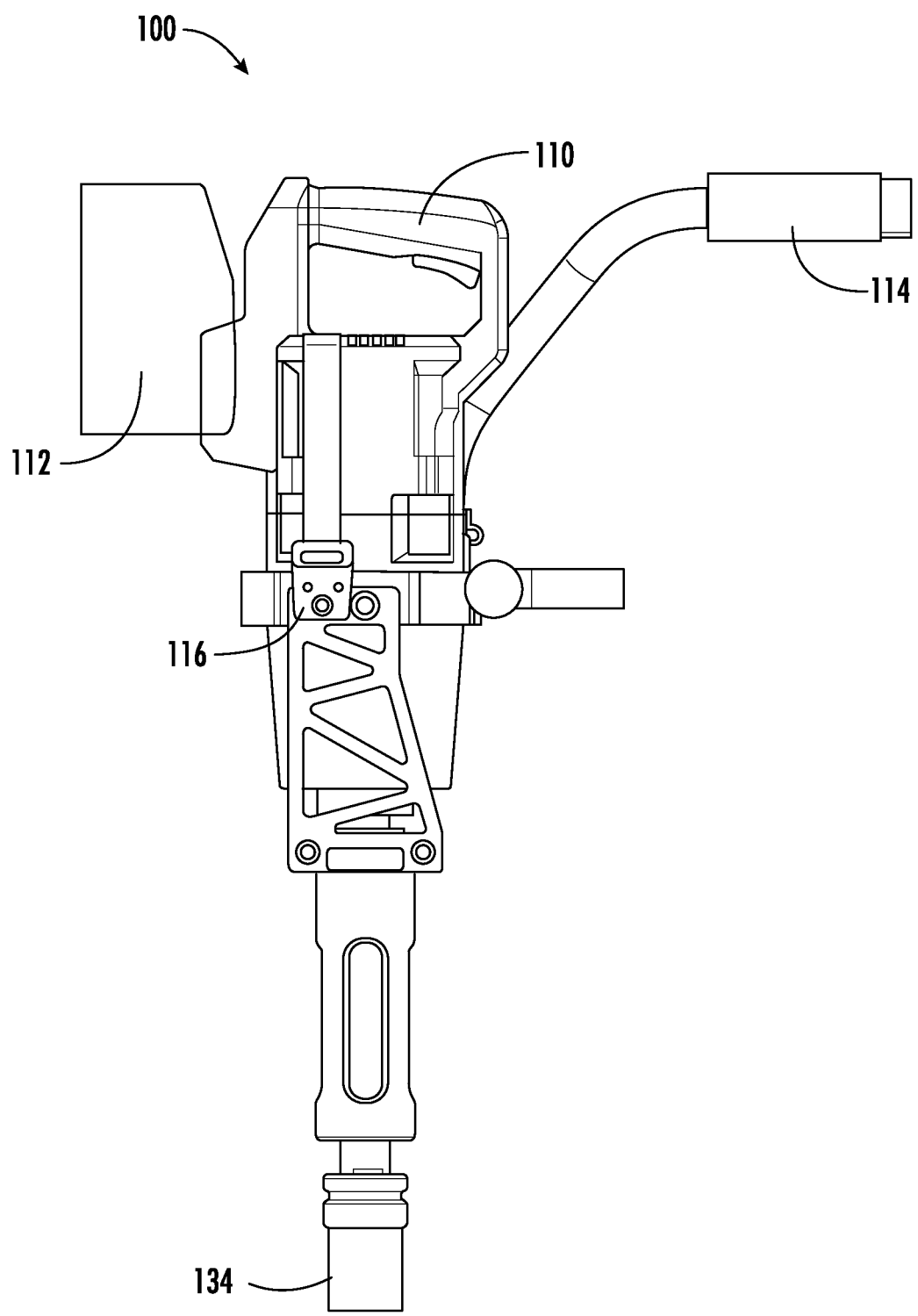
FIG. 11 depicts another side view of the example embodiment of the portable device configured as a lag screw inserter device, according to one or more aspects described herein.

FIG. 8 depicts a side perspective view of the portable device configured for inserting a lag screw into the hole in the plate and into the wooden tie, according to one or more aspects described herein. FIGS. 9-11 depict an example embodiment of portable device 100 configured as a lag screw inserter device, according to one or more aspects described herein. As described herein, portable device 100 may comprise a tie drill device, a lag screw inserter device, or a device capable of functioning as both a tie drill device and a lag screw inserter device. Accordingly, the portable device depicted in FIGS. 8-11 may comprise a lag screw inserter device or a device capable of functioning as both a tie drill device and a lag screw inserter device that is depicted in a configuration in which a lag screw socket (e.g., lag screw socket 134) is attached to portable device 100 via quick connect and disconnect connector 130.

In various embodiments, portable device 100 may include a handle assembly. For example, portable device 100 may include a T-handle assembly 170 and/or one or more other components the same as or similar to the components of railroad spike remover 100, 300, and 500 described in U.S. patent application Ser. No. 16/734,125, entitled "RAILROAD SPIKE REMOVER," the disclosure of which is hereby incorporated by reference in its entirety herein.

Figure 12A:
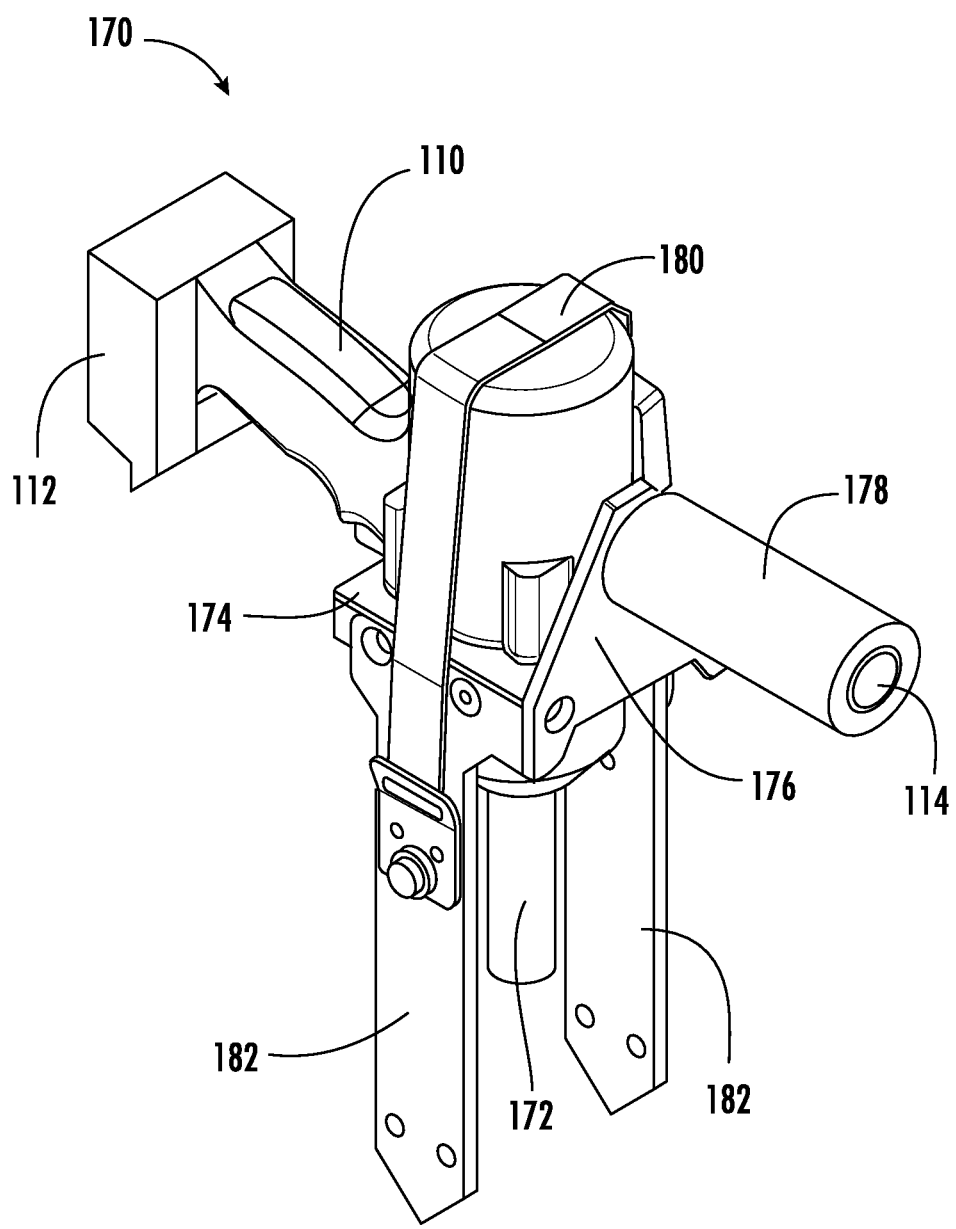
FIGS. 12A-12C depict perspective views of an example T-handle assembly of the portable device, according to one or more aspects described herein.
Figure 12B:
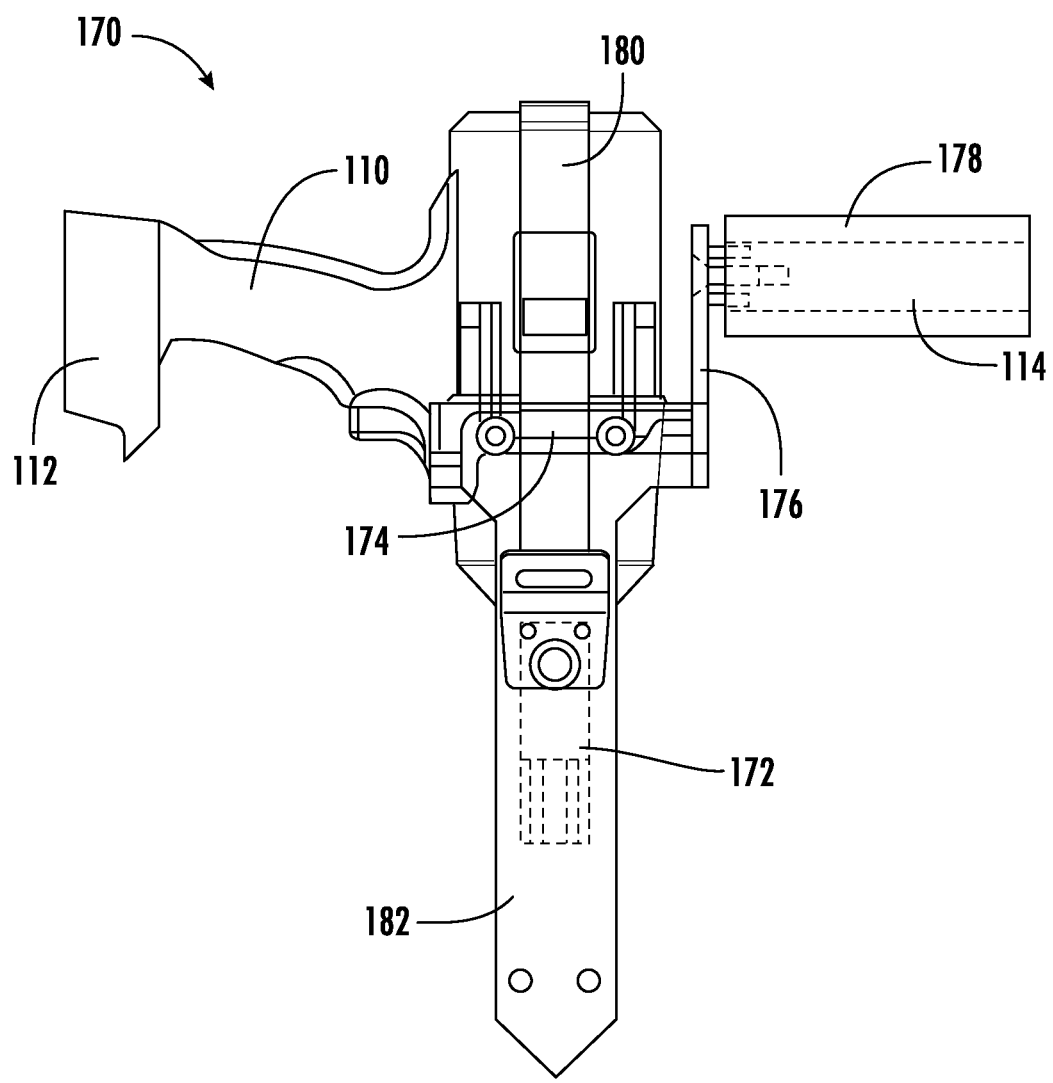
Figure 12C:
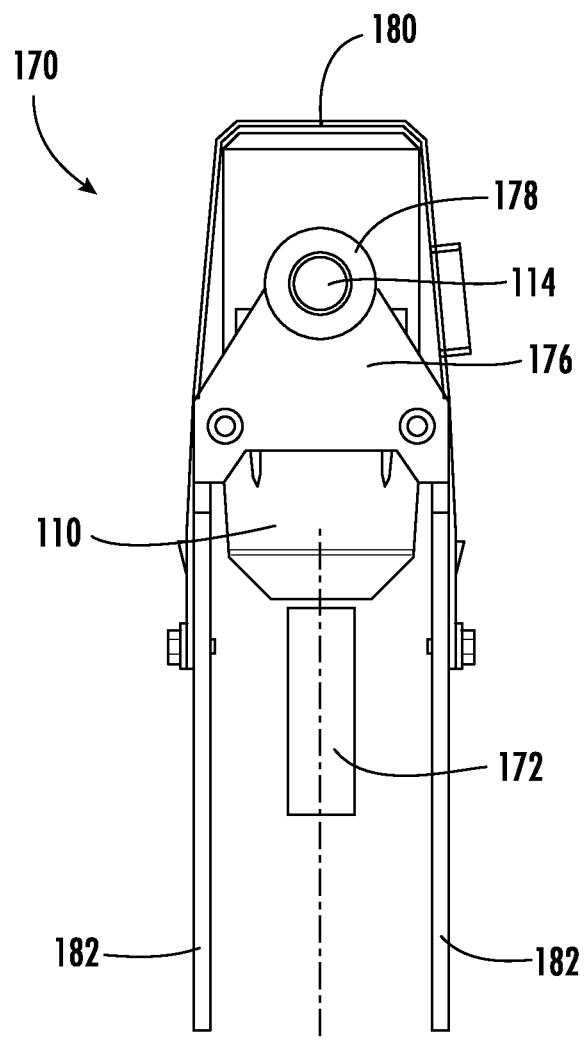

FIGS. 12A-12C depict perspective views of an example T-handle assembly 170 of portable device 100, according to one or more aspects described herein. As illustrated in FIGS. 12A-12C, a T-handle assembly 170 of portable device 100 may be configured to connect drill 110 to portable device 100. For example, in some embodiments, T-handle assembly 170 may be configured to connect drill 110 to a drive shaft of portable device 100 in order to rotate the drive shaft. In various embodiments, a top end of a drive shaft of portable device 100 may have a drive element to allow a user to engage the drive shaft with the T-handle assembly 170 and the drill 110 (e.g., which may comprise a tool such as a high-impact torque wrench or similar device to rotate the drive shaft). As described herein, drill 110 may include a rechargeable battery pack 112. The drive element may have a hexagonal shape to be engaged by a standard hexagonal high impact socket 172 on T-handle assembly 170. In some embodiments, standard hexagonal socket 172 may be 0.5 inches or larger. A battery-operated drill-type apparatus (i.e., drill 110) or an air hammer attached to a pneumatic supply could be utilized as the rotating tool, thereby engaging the drive shaft and rotating the drive shaft to move the drive shaft up and down. In various embodiments, T-handle assembly 170 may also be configured to allow drill 110 to be easily removed by a user and removed for storage.

In various embodiments, T-handle assembly 170 may include a drill face plate 174 to hold the drill 110. The drill face plate 174 may be connected to a handle plate 176 extending perpendicular to the drill face plate 174. In some embodiments, handle 114 may be extend perpendicular and be connected to the handle plate 176. In various embodiments, a handle grip 178 may surround the handle 114 and may be made of a foam material. One or more fastening straps 180 and one or more side plates 182 may be utilized to connect the T-handle assembly 170 to the body of portable device 100. The one or more fastening strips 180 may be designed to be quick-connect straps to quickly disconnect the drill 110 from portable device 100. The one or more side plates 182 may extend from and connect to the drill face plate 174. The one or more straps 180 may surround and secure the drill 110 to the drill face plate 174, thereby securing the drill 110 to the body of portable device 100. Additionally, the drill 110 may be attached to an impact socket 172 which then connects to the drive element of the drive shaft of portable device 100.

Figure 13A:
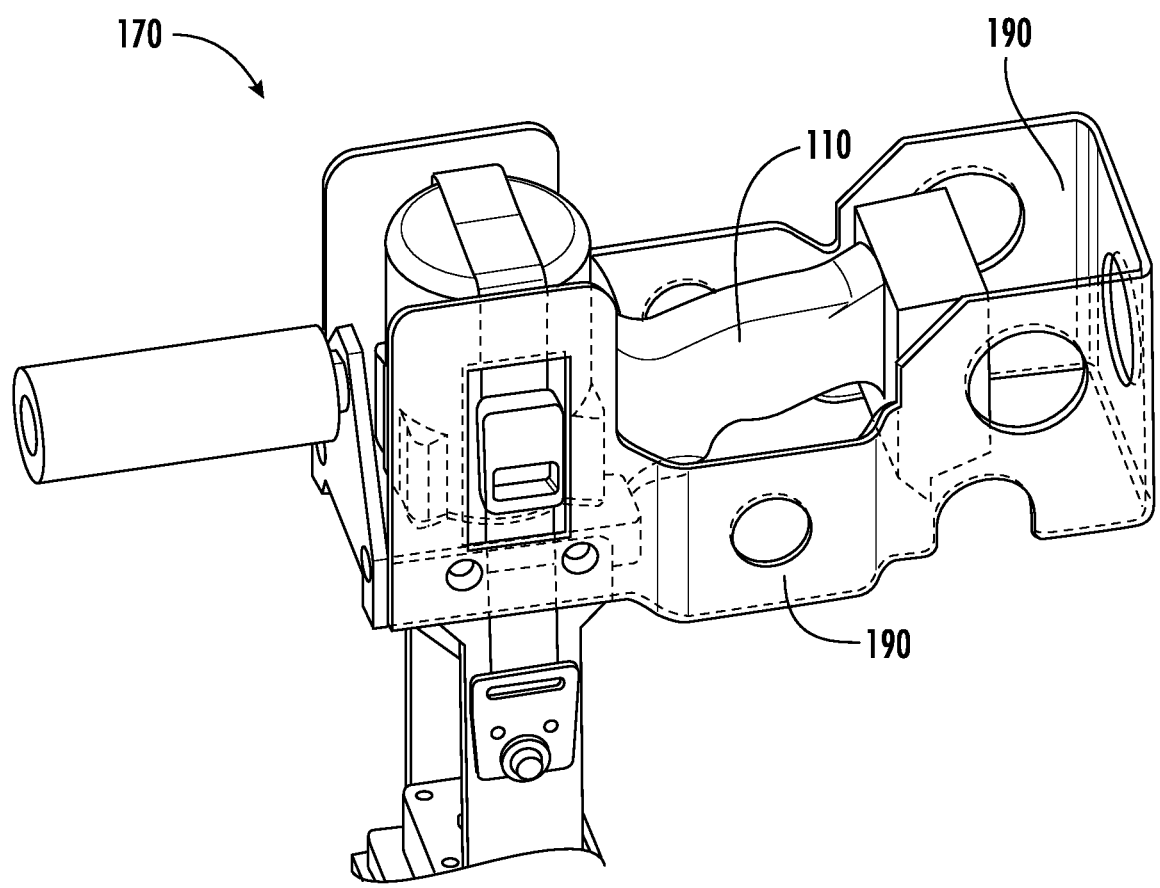
FIG. 13A and FIG. 13B depict perspective views of an example drill guard assembly for the T-handle assembly of the portable device, according to one or more aspects described herein.
Figure 13B:
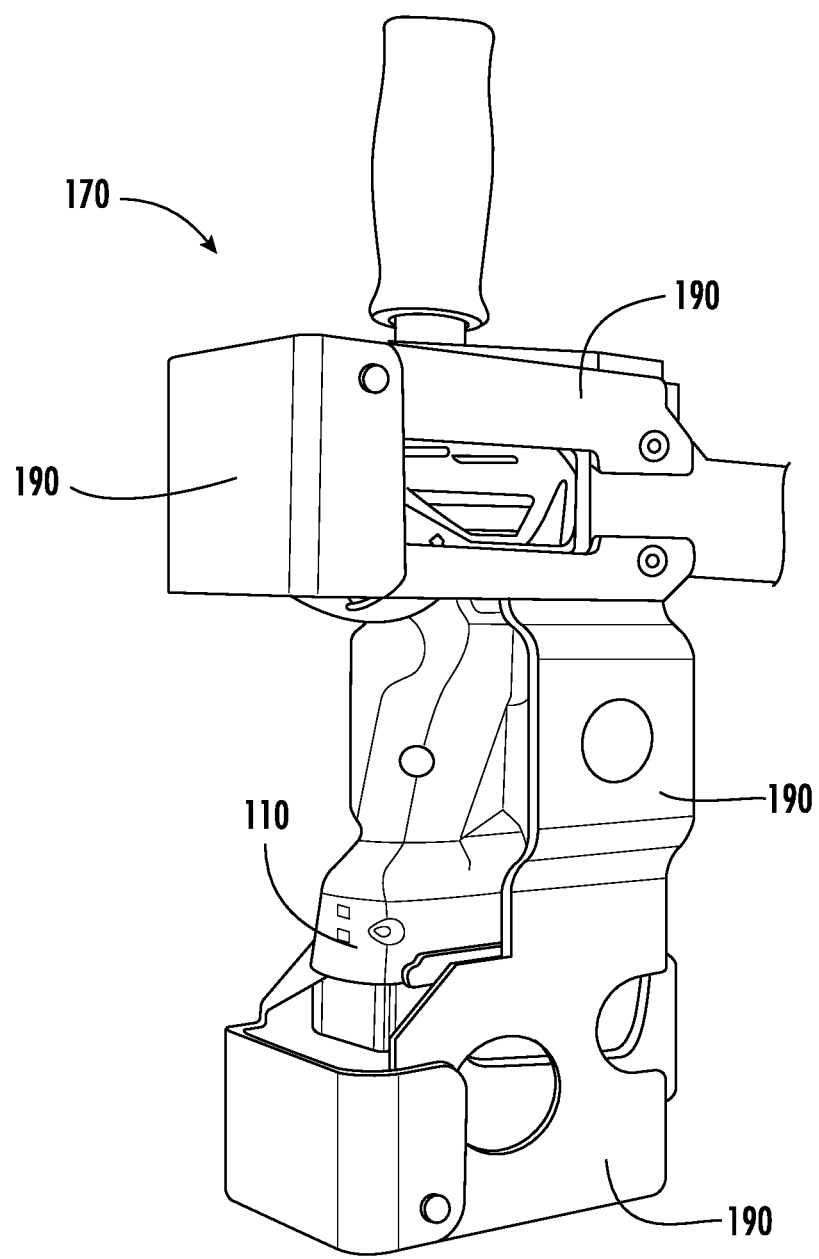

In some embodiments, T-handle assembly 170 may include a drill guard structure 190. FIG. 13A and FIG. 13B depict perspective views of an example drill guard assembly 190 for a T-handle assembly 170 of portable device 100, according to one or more aspects described herein. Drill guard structure 190 may be connected to T-handle assembly 170 and provide a guard for drill 110. Drill guard structure 190 may include a case over the drill 110 while allowing the user to hole the drill 110. Drill guard structure 190 may include side panels that extend the length of the drill 110 and a back panel that covers the battery area. Drill guard structure 190 may also include front panels that cover the rotating section of the drill 110.

In some embodiments, portable device 100 may include an integral and removably attachable means to move and position device 100 utilizing slide plate and/or wheels to minimize lifting requirements for the device, thereby improving usability and efficiency, while also improving safety and decreasing potential of injury.

In some embodiments, portable device 100 may include a quick-change feature that can be a quick connect/disconnect feature, or alternately be integral to the device 100 allowing operator switching between the dual function modes (for both the gear box and the drill/socket elements).

In some embodiments, portable device 100 may include a feed component configured to feed screws into portable device 100 via a cartridge, chute, tape, or other means connected to portable device 100. In some embodiments, portable device 100 may include a feature to set the screw in the drilled hole via impact or press, as part of portable device 100.

In some embodiments, portable device 100 may include a tracking component configured to track usage of the device 100. For example, the tracking component may be configured to track a number of holes drilled, a number of lags driven, an amount of time to drill or drive each, an amount of time per number of holes drilled and/or driven, and/or one or more other measurements and/or metrics related to the usage of portable device 100. In some embodiments, the tracking component may be configured to track an amount of uses since last maintenance, a power/charge level (i.e., indicating when to replace battery and/or drill/motor), diagnostics, preventative maintenance, and other data for product improvement. These tracking features may be electronic and/or a based on a manual/mechanical counter.

In some embodiments, portable device 100 may decrease weight by utilizing materials and alloys such as carbon fiber to replace structural components.

In some embodiments, portable device 100 may include an integral light to improve user visibility. In some embodiments, the integral light may be configured to turn on automatically during drill and lag operation and/or turn on manually based on user input (e.g., by flipping a switch on portable device 100).

The present disclosure is disclosed above and in the accompanying drawings with reference to a variety of examples. The purpose served by the disclosure, however, is to provide examples of the various features and concepts related to the disclosure, not to limit the scope of the invention. It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, one skilled in the relevant art will recognize that numerous variations and modifications may be made to the examples described above without departing from the scope of the present disclosure. Thus, the spirit and scope of the invention should be construed broadly as set forth in the appended claims.

What is claimed is:

1. A portable device for drilling a hole through a plate and into a wooden tie and/or inserting a lag screw into a hole in a plate and into a wooden tie, the portable device comprising:

an electric-powered drill;

a handle assembly comprising a handle, one or more fastening straps to removably secure the electric-powered drill to the portable device, and one or more side plates to connect the handle assembly to a body of the portable device;

a gear ratio and gear reduction system configured to change a speed or torque setting of the portable device independently from the electric-powered drill; and a drill bit configured to drill a hole through a plate and into a wooden tie or a lag screw socket configured to insert a lag screw into the hole in the plate and into the wooden tie.

2. The portable device of claim 1, wherein the electric-powered drill is a battery-operated drill.

3. The portable device of claim 2, wherein the electric-powered drill includes a rechargeable battery configured to provide power to the portable device.

4. The portable device of claim 1, wherein the electric-powered drill is powered by an integrally-powered DC motor, servo motor, or stepper motor, AC power, or a replaceable fuel cell.

5. The portable device of claim 1, the portable device further comprising a first quick connect/disconnect component for removably connecting the electric-powered drill to the portable device.

6. The portable device of claim 5, wherein the first quick connect/disconnect component is configured to connect the electric-powered drill to the gear ratio and gear reduction system.

7. The portable device of claim 5, the portable device further comprising a second quick connect/disconnect component configured to receive the drill bit and the lag screw socket and interchangeably connect the drill bit or the lag screw socket to the portable device.

8. The portable device of claim 1, the portable device further comprising a spring-guided mechanism that provides a pre-set distance system with an adjustable knob.

9. The portable device of claim 8, wherein the spring-guided mechanism spans from one or more off sets and an offset plate as part of the portable device.

10. The portable device of claim 1, the portable device further comprising a removable drill guard configured to protect the drill bit.

11. The portable device of claim 1, the portable device further comprising a leveling plate configured to ensure that the drill bit and the lag screw are aligned and held in a vertical position.

12. The portable device of claim 1, the portable device further comprising an integral and removably attachable means to move and position the portable device utilizing a slide plate and/or wheels.

13. The portable device of claim 1, the portable device further comprising a component to feed a plurality of screws into the portable device.

14. The portable device of claim 1, the portable device further comprising a component to set a screw in a drilled hole via impact or press.

15. The portable device of claim 1, the portable device further comprising a tracking component configured to track usage of the portable device.

16. The portable device of claim 15, wherein the tracking component is configured to track one or more of the following: a number of holes drilled, a number of lags driven, an amount of time to drill or drive each screw, an amount of time for number of holes drilled and/or driven an amount of uses since last maintenance, or a power/charge level.

17. The portable device of claim 1, wherein the tracking component is an electronic device or a mechanical counter.

18. The portable device of claim 1, wherein one or more components of the portable device are made of carbon fiber.

19. The portable device of claim 1, the portable device further including an integral light.

20. The portable device of claim 19, wherein the integral light is configured to automatically turn on during drill and lag operation.

* * * * *